United States Patent
Yang et al.

(10) Patent No.: US 12,450,894 B2
(45) Date of Patent: Oct. 21, 2025

(54) INTELLIGENT MOBILE PATROL METHOD AND SYSTEM THEREOF

(71) Applicant: Huaneng Suzhou Thermal Power Co., Ltd, Jiangsu (CN)

(72) Inventors: Qun Yang, Jiangsu (CN); Hao Sha, Jiangsu (CN); Jixiong Bao, Jiangsu (CN); Jiandong Zhang, Jiangsu (CN); Huimin Guo, Jiangsu (CN); Yongfeng Zheng, Jiangsu (CN); Xiaohua Feng, Jiangsu (CN); Hui Xu, Jiangsu (CN); Zhihua Li, Jiangsu (CN); Guoxing Liu, Jiangsu (CN); Hao Xu, Jiangsu (CN); Yue Pan, Jiangsu (CN); Juelin Zhao, Jiangsu (CN); Yan Chen, Jiangsu (CN); Guquan Zhu, Jiangsu (CN)

(73) Assignee: HUANENG SUZHOU THERMAL POWER CO., LTD, Suzhou (CN)

( * ) Notice: Subject to any disclaimer, the term of this patent is extended or adjusted under 35 U.S.C. 154(b) by 476 days.

(21) Appl. No.: 17/980,575

(22) Filed: Nov. 4, 2022

(65) Prior Publication Data
US 2023/0326198 A1   Oct. 12, 2023

(30) Foreign Application Priority Data

Apr. 8, 2022   (CN) .......................... 202210376675.0

(51) Int. Cl.
*G06V 10/44*   (2022.01)
*G06Q 10/20*   (2023.01)
(Continued)

(52) U.S. Cl.
CPC ............. *G06V 10/95* (2022.01); *G06Q 10/20* (2013.01); *G06T 5/73* (2024.01); *G06V 10/44* (2022.01);
(Continued)

(58) Field of Classification Search
CPC ........ G06V 10/95; G06V 20/46; G06V 10/44; G06V 10/50; G06V 10/56; G06V 10/764;
(Continued)

(56) References Cited

U.S. PATENT DOCUMENTS 10,824,867 B1 *   11/2020   Assam ................... G06Q 40/08
10,939,066 B2 *   3/2021    Waniguchi ......... H04N 21/6543
(Continued)

FOREIGN PATENT DOCUMENTS

WO   WO-2020051087 A1 *   3/2020   ........... G06F 16/532
WO   WO 2020/153916 A1 *   7/2020

OTHER PUBLICATIONS

Vigneswara Rao Gannapathy, A mobile and web-based security guard patrolling, monitoring and reporting system to maintain safe and secure environment at premises, https://research.ebsco.com/c/kxcca7/viewer/pdf/eypbbsyyzz ; ( 2023 ) (Year: 2023).*
(Continued)

*Primary Examiner* — Sarah M Monfeldt
*Assistant Examiner* — Victor Chigozirim Esonu

(57) ABSTRACT

An intelligent mobile patrol method and system are provided. The method includes identifying a patrol task; accumulating on-site visual data; uploading the on-site visual data; automatically importing equipment exceptions; and consolidating and transmitting an obtained patrol record data.

5 Claims, 1 Drawing Sheet

(51) Int. Cl.
*G06T 5/73* (2024.01)
*G06V 10/94* (2022.01)
*G06V 20/40* (2022.01)
*H04N 7/18* (2006.01)
*H04W 4/30* (2018.01)
*H04W 4/80* (2018.01)

(52) U.S. Cl.
CPC .............. *G06V 20/46* (2022.01); *H04N 7/183* (2013.01); *G06T 2207/20021* (2013.01); *G06T 2207/20192* (2013.01); *H04W 4/30* (2018.02); *H04W 4/80* (2018.02)

(58) Field of Classification Search
CPC ........ G06V 20/52; G06V 10/28; G06V 10/40; G06T 5/73; G06T 2207/20021; G06T 2207/20192; G06Q 10/20; H04N 7/183; H04W 4/30; H04W 4/80; Y04S 10/50; G07C 3/00; G07C 1/20
See application file for complete search history.

(56) References Cited

U.S. PATENT DOCUMENTS

| | | | |
|---|---|---|---|
| 2004/0046646 A1* | 3/2004 | Eskridge | G08G 1/127 235/487 |
| 2015/0029222 A1* | 1/2015 | Hofmann | G06T 7/74 382/103 |
| 2017/0206689 A1* | 7/2017 | Eo | G06T 3/18 |
| 2018/0307045 A1* | 10/2018 | Nishi | G02B 27/017 |
| 2019/0082137 A1* | 3/2019 | Waniguchi | H04N 21/4223 |
| 2020/0026257 A1* | 1/2020 | Dalal | G05B 19/4063 |
| 2020/0348662 A1* | 11/2020 | Cella | G05B 19/41865 |
| 2020/0356960 A1* | 11/2020 | Dryer | G07D 11/26 |
| 2021/0081698 A1* | 3/2021 | Lindeman | G06Q 30/0283 |
| 2025/0078426 A1* | 3/2025 | Ostyn | G06F 3/0482 |

OTHER PUBLICATIONS

Gannapathy et al. IEEE A mobile and web-based security guard patrolling, monitoring and reporting system to maintain safe and secure environment at premises 2023 (Year: 2023).*

* cited by examiner

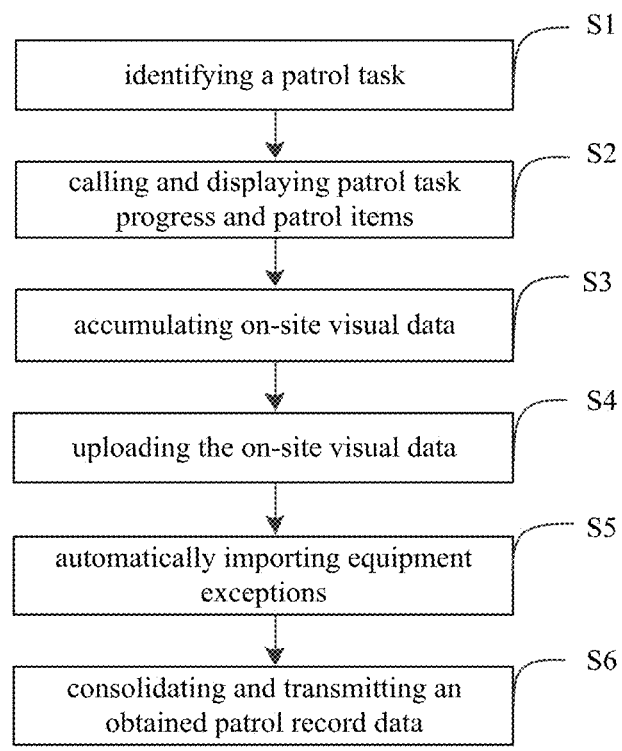

INTELLIGENT MOBILE PATROL METHOD AND SYSTEM THEREOF

TECHNICAL FIELD

The invention relates to the technical field of intelligent mobile patrol, particularly an intelligent mobile patrol method and a system thereof.

BACKGROUND ART

The equipment patrol system is a system that raises the level of equipment maintenance by ensuring patrol quality and improving patrol efficiency, and aims to be updated with the changes of the equipment operation status and the surrounding environment, detect the facility defects and hidden dangers that endanger safety, and take effective measures in time to ensure the safety of the equipment and system stability.

At present, the patrol inspection process of power plants lacks a perfect management system and an application system thereof, thus, intelligent management cannot be realized in patrol operation and patrol management, which has caused the following problems: the patrol effect cannot be guaranteed, resulting in missed inspection or untimely inspection; manual completion of patrol results is inefficient, and easily causes missing items or mistakes; managers cannot know the line conditions timely, accurately or comprehensively; and the overall management of patrol lacks systematicness and scientific analysis, which makes it difficult to formulate the best maintenance and repair plan. Therefore, the invention provides an intelligent mobile patrol method and a system thereof to solve the above problems.

CONTENT OF INVENTION

The invention provides an intelligent mobile patrol method and a system thereof to overcome the defects in the prior art.

To serve the above purpose, the invention adopts the following technical solution:

An intelligent mobile patrol method comprises the following steps:

An intelligent mobile device bound with Near Field Communication (NFC) is used to identify the patrol task process;

A patrol display point calls and displays the progress of the patrol task and the items inspected;

According to the patrol items of the patrol display point, a mobile terminal is used to collect on-site photos, recordings, videos and other information to accumulate on-site visual data;

The visual data obtained are uploaded for intelligent processing and analysis, and the historical patrol records are queried in real time to analyze the maintenance rate, missing inspection rate and equipment availability rate;

and the patrol records of WiFi or network real-time record points are used to automatically import equipment exceptions into the missing library.

The obtained patrol record data information is consolidated and transmitted to the patrol terminal for recording, real-time calling and pushing, and generating a work cycle.

Preferentially, the method that the visual data obtained are uploaded for intelligent processing and analysis, and the historical patrol records are queried in real time to analyze the maintenance rate, missing inspection rate and equipment availability rate is as follows:

According to the obtained on-site visual data, image preprocessing is carried out for the screen information of on-site visual data;

The features of the processed visual data are extracted to obtain the corresponding feature data in the screen;

The feature data is identified and compared with the data in database;

According to the comparison and screening results, the historical data of the corresponding database is extracted for data accounting, and the patrol data is updated to form a new patrol record.

Preferentially, the method that the patrol records of WiFi or network real-time record points are used to automatically import equipment exceptions into the missing library, and the obtained patrol record data information is consolidated and transmitted to the patrol terminal for recording, real-time calling and pushing, and generating a work cycle is as follows:

The equipment standing book is recorded, and the equipment information is recorded and provided to reflect the basic parameters of the equipment and the maintenance history, so as to provide necessary information for the daily maintenance and management of the equipment;

The equipment defect management process of exception import, exception elimination and exception elimination acceptance is completed through the circulation of exception sheets, and the equipment exceptions are counted in multiple dimensions;

The report design and configuration are automatically generated according to the data information obtained, and the report is approved and viewed on the mobile terminal. The combination of statistical graphics and form data is used for multi-dimensional stereoscopic push;

According to the displayed data, the system automatically generates the regular work of related positions according to the cycle, and records the completion status.

Preferentially, the method that according to the obtained on-site visual data, image preprocessing is carried out for the screen information of on-site visual data is as follows:

Each pixel gray scale of the visual data is transformed to expand the gray scale range of the visual data image;

The visual data clarity is improved to balance the spatial pixel value uniformity of the visual data image;

The fuzzy enhancement is carried out at the edge; so that the boundary distinction is strengthened.

Preferentially, the method that the features of the processed visual data are extracted to obtain the corresponding feature data in the screen is as follows;

Gamma correction method is adopted to standardize the color space of the input image;

The gradient of each pixel of the image is calculated to capture the contour information and weaken the interference of light;

The image is divided into small cells to count the gradient histogram of each small cell;

Every several small cells are formed into a block to obtain the feature block of the block;

The feature blocks obtained are concatenated to obtain the feature data of the image for classification.

An intelligent mobile patrol system comprises the following:

A patrol system used for the overall control of relevant patrol equipment;

A patrol process identification unit used to identify the patrol task process through the intelligent mobile equipment bound with NFC;

A patrol display unit used to call and display the patrol task process and the patrol items through the patrol display point;

A data transmission channel used for the data information transmission among related equipment;

A patrol collection unit used to collect on-site photos, recordings, videos and other information by mobile phone terminal according to patrol items of patrol display points, and accumulate on-site visual data;

A database used to store data from the beginning to the end of maintenance;

A data intelligent analysis unit used to upload the obtained visual data for intelligent processing and analysis, query the historical patrol records in real time, and analyze the maintenance rate, missing inspection rate and equipment availability rate;

A patrol auxiliary unit using WiFi or network to record point patrol records in real time, automatically import equipment exceptions, and consolidate and transmit the obtained patrol record data information to the patrol terminal for recording, real-time calling and pushing, and generating the work cycle.

Preferentially, the database comprises a real-time data storage module, a historical data storage module and a data comparison module;

The real-time data storage module is used for storing the patrol collection data of the current day;

The historical data storage module is used to store the historical data of the patrol collection data.

Compared with the prior art, the invention has the following advantages:

The invention adopts the relevant elements that meet the technical requirements of standardized management of electric power enterprises to uniformly identify and manage the point patrol objects, establish the point patrol operation standard library and high intelligence. Also, the invention combines intelligent mobile devices and NFC technology, intelligent push of the point patrol plan, intelligent remind, real-time report of records, and intelligent query and counts, and supports multimedia information collection of point patrol objects, comprehensively covering the whole process from planning, execution and statistical analysis, to result upload and exception diagnosis in the daily point patrol inspection of power enterprises, as well as supports the automatic import of exceptions. In addition, the invention adopts NFC and mobile terminal, which is easy to operate and greatly improves the working efficiency of field personnel. By combining mobile Internet, NFC, APP and other technologies, the invention enables supervisors and inspectors to be in place, improves equipment point patrol efficiency, reduces work intensity and improves equipment management level.

FIGURES

FIG. 1 depicts a flow diagram associated with an intelligent mobile patrol method according to an embodiment of the invention.

DESCRIPTION OF PREFERRED EMBODIMENTS

The technical solutions in the embodiments of the invention are described clearly and completely by combining with the figures in the embodiments of the invention. Obviously, the described embodiments are only part but not all of the embodiments of the invention.

Referring to FIG. 1, the intelligent mobile patrol method comprises the following steps:

S1: an intelligent mobile device bound with NFC is used to identify the patrol task process;

S2: a patrol display point calls and displays the progress of the patrol task and the items inspected;

S3: according to the patrol items of the patrol display point, a mobile terminal is used to collect on-site photos, recordings, videos and other information to accumulate on-site visual data;

S4: the visual data obtained are uploaded for intelligent processing and analysis, and the historical patrol records are queried in real time to analyze the maintenance rate, missing inspection rate and equipment availability rate.

According to the obtained on-site visual data, image preprocessing is carried out for the screen information of on-site visual data;

Each pixel gray scale of the visual data is transformed to expand the gray scale range of the visual data image;

If the gray function $f(x, y)$ of designed image is changed to a new image function $g(x, y)$ by the transformation function $T(\ )$, which is as follows:

$$g(x,y)=T(x,y))$$

The contrast is enhanced by transformation;

The gray level transformation method is mainly divided into a linear transformation method and a piecewise linear transformation method;

For linear transformation, it assumes that the gray scale range of the source image is $[a, b]$, the grayscale range of the transformed image is expected to be extended to $[c, d]$;

Linear transformation is represented as:

$$g(x,y)=[(d-c)/(b-a)]f(x,y)+c$$

If the gray levels of most pixels in the image are distributed in the interval $[a, b]$, the small gray level exceeds this interval, thus, to improve the enhancing effect, it can make the follows:

$$g(x, y) = \begin{cases} c & 0 < f(x, y) < a \\ [(d-c)/(b-a)]f(x, y) + c & a \le f(x, y) < b \\ d & b \le f(x, y) < L \end{cases}$$

The visual data clarity is improved to balance the spatial pixel value uniformity of the visual data image;

The fuzzy enhancement is carried out at the edge, so that the boundary distinction is strengthened.

The method that the features of the processed visual data are extracted to obtain the corresponding feature data in the screen is as follows;

Gamma correction method is adopted to standardize the color space of the input image;

The gradient of each pixel of the image is calculated to capture the contour information and weaken the interference of light;

The image is divided into small cells to count the gradient histogram of each small cell;

Every several small cells are formed into a block to obtain the feature block of the block;

The feature blocks obtained are concatenated to obtain the feature data of the image for classification.

The feature data is identified and compared with the data in database;

According to the comparison and screening results, the historical data of the corresponding database is extracted for data accounting, and the patrol data is updated to form a new patrol record.

S5: the patrol records of WiFi or network real-time record points are used to automatically import equipment exceptions into the missing library;

S6: the obtained patrol record data information is consolidated and transmitted to the patrol terminal for recording, real-time railing and pushing, and generating a work cycle. The method is as follows:

The equipment defect management process of exception import, exception elimination and exception elimination acceptance is completed through the circulation of exception sheets, and the equipment exceptions are counted in multiple dimensions;

The report design and configuration are automatically generated according to the data information obtained, and the report is approved and viewed on the mobile terminal. The combination of statistical graphics and form data is used for multi-dimensional stereoscopic push;

According to the displayed data, the system automatically generates the regular work of related positions according to the cycle, and records the completion status.

An intelligent mobile patrol system comprises the following:

A patrol system used for the overall control of relevant patrol equipment;

A patrol process identification unit used to identify the patrol task process through the intelligent mobile equipment bound with NFC;

A patrol display unit used to rail and display the patrol task process and the patrol items through the patrol display point;

A data transmission channel used for the data information transmission among related equipment;

A patrol collection unit used to collect on-site photos, recordings, videos and other information by mobile phone terminal according to patrol items of patrol display points, and accumulate on-site visual data;

A database used to store data from the beginning to the end of maintenance. The database comprises a real-time data storage module, a historical data storage module and a data comparison module;

The real-time data storage module is used for storing the patrol collection data of the current day;

The historical data storage module is used to store the historical data of the patrol collection data;

A data intelligent analysis unit used to upload the obtained visual data for intelligent processing and analysis, query the historical patrol records in real time, and analyze the maintenance rate, missing inspection rate and equipment availability rate;

According to the obtained on-site visual data, image preprocessing is carried out for the screen information of on-site visual data;

The visual data obtained are uploaded for intelligent processing and analysis, and the historical patrol records are queried in real time to analyze the maintenance rate, missing inspection rate and equipment availability rate.

Each pixel gray scale of the visual data is transformed to expand the gray scale range of the visual data image;

If the gray function $f(x, y)$ of designed image is changed to a new image function $g(x, y)$ by the transformation function $T(\ )$, which is as follows:

$$g(x,y)=T(f(x,y))$$

The contrast is enhanced by transformation;

The gray level transformation method is mainly divided into a linear transformation method and a piecewise linear transformation method;

For linear transformation, it assumes that the gray scale range of the source image is [a, b], the grayscale range of the transformed image is expected to be extended to [c, d];

Linear transformation is represented as:

$$g(x,y)=[(d-c)/(b-a)]f(x,y)+c$$

If the gray levels of most pixels in the image are distributed in the interval [a, b], the small gray level exceeds this interval, thus, to improve the enhancing effect, it can make the follows:

$$g(x, y) = \begin{Bmatrix} c & 0 < f(x, y) < a \\ [(d - c)/(b - a)]f(x, y) + c & a \le f(x, y) < b \\ d & b \le f(x, y) < L \end{Bmatrix}$$

The visual data clarity is improved to balance the spatial pixel value uniformity of the visual data image;

The fuzzy enhancement is carried out at the edge, so that the boundary distinction is strengthened.

The method that the features of the processed visual data are extracted to obtain the corresponding feature data in the screen is as follows:

Gamma correction method is adopted to standardize the color space of the input image;

The gradient of each pixel of the image is calculated to capture the contour information and weaken the interference of light;

The image is divided into small cells to count the gradient histogram of each small cell;

Every several small cells are formed into a block to obtain the feature block of the block;

The feature blocks obtained are concatenated to obtain the feature data of the image for classification.

The feature data is identified and compared with the data in database;

According to the comparison and screening results, the historical data of the corresponding database is extracted for data accounting, and the patrol data is updated to form a new patrol record.

A patrol auxiliary unit using WiFi or network to record point patrol records in real time, automatically import equipment exceptions, and consolidate and transmit the obtained patrol record data information to the patrol terminal for recording, real-time calling and pushing, and generating the work cycle.

The equipment standing book is recorded, and the equipment information is recorded and provided to reflect the basic parameters of the equipment and the maintenance history, so as to provide necessary information for the daily maintenance and management of the equipment;

The equipment defect management process of exception import, exception elimination and exception elimination acceptance is completed through the circulation of exception sheets, and the equipment exceptions are counted in multiple dimensions;

The report design and configuration are automatically generated according to the data information obtained, and the report is approved and viewed on the mobile terminal. The combination of statistical graphics and form data is used for multi-dimensional stereoscopic push;

According to the displayed data, the system automatically generates the regular work of related positions according to the cycle, and records the completion status.

An intelligent terminal comprises a memory and a processor, wherein, the memory stores terminal readable instructions. When the processor executes the terminal readable instructions, the steps of the intelligent mobile patrol method as described in any one of claims 1 to 5 are realized.

A terminal readable storage medium is characterized in that the terminal readable instructions are stored on the terminal readable storage medium. When the terminal readable instructions are executed by the processor, the terminal readable storage medium realizes the steps of the intelligent mobile patrol method as described in any one of claims 1 to 5.

Any equivalent replacement or change made by any person familiar with the technical field according to the technical solution and the concept of the invention within the technical scope disclosed by the invention shall fall within the protection scope of the invention.

The invention claimed is:

1. An intelligent mobile patrol method, comprising:
   via a processor, sending a patrol task to an intelligent mobile device bound with Near Field Communication (NFC);
   via the intelligent mobile device, identifying the patrol task to collect patrol data including on-site photos, recordings, and videos, wherein the patrol data is accumulated as on-site visual data;
   via the processor, instructing the intelligent mobile device to upload the on-site visual data to a memory for intelligent processing and analysis operation, so as to query historical patrol records in real time and analyze a maintenance rate, a missing inspection rate and an equipment availability rate;
   via the processor, instructing the intelligent mobile device to upload point patrol records to the memory for storage in real time by using WiFi, and automatically import equipment exceptions into a missing library in the memory; and
   via the processor, consolidating and transmitting an obtained patrol record data to the intelligent mobile device, so as to push a real-time patrol task and receive patrol results;
   wherein the intelligent processing and analysis operation comprises:
   via the processor, performing image preprocessing operation on screen information of the on-site visual data to obtain processed visual data;
   via the processor, performing features extracting operation on the processed visual data to obtain corresponding feature data in the screen;
   via the processor, identifying the feature data and comparing the feature data with data in database; and
   via the processor, according to comparison and screening results, extracting historical data of corresponding database for data accounting, and updating the patrol data to form a new patrol task;
   wherein: the image preprocessing operation comprises:
   transforming each pixel gray scale of the visual data to expand the gray scale range of a visual data image; improving the visual data clarity to balance the spatial pixel value uniformity of the visual data image; and performing fuzzy enhancement at an edge of pixel, so as to strengthen boundary distinction;
   the features extracting operation comprises:
   via the processor, adopting gamma correction method to standardize the color space of visual data image;
   via the processor, calculating gradient of each pixel of the visual data image to capture the contour information and weaken the interference of light;
   via the processor, dividing the visual data image into small cells to count the gradient histogram of each small cell;
   via the processor, forming every several small cells into a block to obtain a feature block of a block; and
   via the processor, concatenating the feature block to obtain feature data of the visual data image for classification.

2. The intelligent mobile patrol method according to claim 1, wherein that via the processor, instructing the intelligent mobile device to upload point patrol records to the memory for storage in real time by using WiFi, and automatically import equipment exceptions into a missing library in the memory, comprises:
   via the processor, instructing an equipment standing book to record equipment information, and to provide an inquiry of the equipment information, wherein the equipment information is configured to reflect the basic parameters of the equipment and the maintenance history, so as to provide necessary information for the daily maintenance and management of the equipment; and
   via the processor, instructing the intelligent mobile device to transfer exception sheets, so as to complete an equipment defect management process of exception import, exception elimination and exception elimination acceptance, and at the processor, conducting equipment exceptions statistics in multiple dimensions.

3. The intelligent mobile patrol method according to claim 1, wherein that via the processor, consolidating and transmitting obtained patrol record data to the intelligent mobile device, so as to push a real-time patrol task and receive patrol results, comprises:
   via the processor, automatically generating the real-time patrol task based on the obtained patrol record data, and pushing the real-time patrol task to the intelligent mobile device, wherein the real-time patrol task uses a combination of statistical graphics and form data for multi-dimensional stereoscopic push; and
   via the processor, automatically generating a regular work of related positions according to a cycle, and instructing the intelligent mobile device to upload the patrol results to the memory.

4. An intelligent terminal comprising one or more processors and a non-transitory computer-readable storage medium storing executable instructions that, when executed by the one or more processors, cause the intelligent terminal to perform an intelligent mobile patrol method.

5. A non-transitory computer-readable storage medium comprising memory with instructions encoded thereon, the instructions, when executed by one or more processors, causing the one or more processors to perform an intelligent mobile patrol method.

* * * * *